US012595419B2

(12) United States Patent (10) Patent No.: US 12,595,419 B2
Zheng et al. (45) Date of Patent: Apr. 7, 2026

(54) HOUSEHOLD PERISHABLE GARBAGE TREATMENT EQUIPMENT AND USE METHOD THEREOF

(71) Applicant: Wenzhou University, Wenzhou City (CN)

(72) Inventors: Xiangyong Zheng, Wenzhou City (CN); Ping Ma, Wenzhou City (CN); Min Zhao, Wenzhou City (CN); Wencong Zhu, Wenzhou City (CN); Shunfeng Jiang, Wenzhou City (CN); Zhiquan Wang, Wenzhou City (CN); Huachang Jin, Wenzhou City (CN); Suqing Wu, Wenzhou City (CN); Zhan Jin, Wenzhou City (CN); Ke Bei, Wenzhou City (CN); Bentuo Xu, Wenzhou City (CN); Hainan Kong, Wenzhou City (CN)

(73) Assignee: Wenzhou University, Wenzhou City (CN)

( * ) Notice: Subject to any disclaimer, the term of this patent is extended or adjusted under 35 U.S.C. 154(b) by 235 days.

(21) Appl. No.: 18/408,544

(22) Filed: Jan. 9, 2024

(65) Prior Publication Data

US 2025/0163330 A1 May 22, 2025

(30) Foreign Application Priority Data

Nov. 22, 2023 (CN) .......................... 202311567112.0

(51) Int. Cl.
*C10B 47/06* (2006.01)
*B01D 53/18* (2006.01)
(Continued)

(52) U.S. Cl.
CPC .............. *C10B 47/06* (2013.01); *B01D 53/18* (2013.01); *B09B 3/35* (2022.01); *B09B 3/40* (2022.01); *C10B 53/00* (2013.01); *B09B 2101/25* (2022.01)

(58) Field of Classification Search
CPC ......... C10B 47/06; C10B 53/00; B01D 53/18; B09B 3/35; B09B 3/40
See application file for complete search history.

(56) References Cited

U.S. PATENT DOCUMENTS 5,980,823 A * 11/1999 Nekozuka ............... A61L 11/00
422/4
6,051,110 A * 4/2000 Dell'Orfano ........... C10B 49/14
202/262

(Continued)

*Primary Examiner* — Jonathan Miller
(74) *Attorney, Agent, or Firm* — CM Law LLP; Robert C. Klinger

(57) ABSTRACT

A household perishable garbage treatment equipment and a use method thereof are provided, relating to the technical field of environmental engineering. The equipment includes a crushing unit, a pyrolysis unit, and a condensation and washing unit. Perishable garbage is crushed by the crushing unit, then the crushed perishable garbage is pyrolyzed into pyrolytic biochar by the pyrolysis unit, and gas produced in the pyrolysis process is condensed and collected by the condensation and washing unit. The household perishable garbage treatment equipment and the use method thereof can effectively treat perishable garbage on the spot, reduce the collection and treatment cost required by traditional perishable garbage treatment modes, achieve carbon sequestration and resource utilization of products, and have significant economic, ecological and social benefits.

9 Claims, 1 Drawing Sheet

(51) Int. Cl.

| | | |
|---|---|---|
| *B09B 3/35* | (2022.01) | |
| *B09B 3/40* | (2022.01) | |
| *C10B 53/00* | (2006.01) | |
| *B09B 101/25* | (2022.01) | |

(56) References Cited

U.S. PATENT DOCUMENTS

| | | | | |
|---|---|---|---|---|
| 10,738,255 | B2 * | 8/2020 | White | C10B 47/44 |
| 11,458,414 | B2 * | 10/2022 | Lee | C12M 45/02 |
| 11,879,106 | B2 * | 1/2024 | White | C10L 5/406 |
| 12,303,827 | B2 * | 5/2025 | Khan | B65F 1/14 |
| 2008/0014112 | A1 * | 1/2008 | Lee | C10L 5/46 |
| | | | | 422/26 |
| 2008/0307703 | A1 * | 12/2008 | Dietenberger | C10J 3/57 |
| | | | | 48/203 |
| 2016/0122674 | A1 * | 5/2016 | White | C10L 5/46 |
| | | | | 44/605 |
| 2021/0122989 | A1 * | 4/2021 | White | C10B 53/07 |
| 2023/0173503 | A1 * | 6/2023 | Kim | B02C 18/0084 |
| | | | | 241/65 |

* cited by examiner

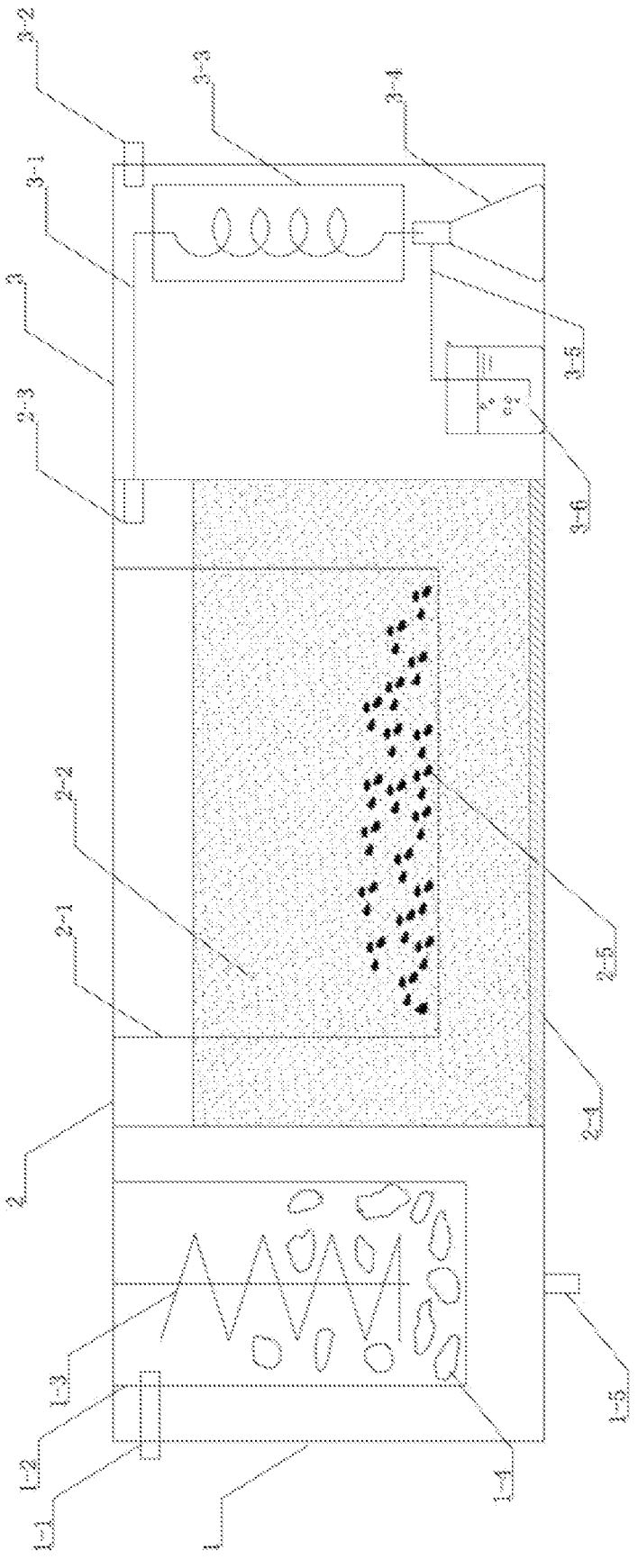

HOUSEHOLD PERISHABLE GARBAGE TREATMENT EQUIPMENT AND USE METHOD THEREOF

CROSS-REFERENCE TO RELATED APPLICATION

This patent application claims the benefit and priority of Chinese Patent Application No. 202311567112.0 filed with the China National Intellectual Property Administration on Nov. 22, 2023, the disclosure of which is incorporated by reference herein in its entirety as part of the present application.

TECHNICAL FIELD

The present disclosure relates to the technical field of environmental engineering, in particular to a household perishable garbage treatment equipment, and a use method thereof.

BACKGROUND

Household perishable garbage usually refers to organic solid waste produced in the daily life of urban residents, mainly including kitchen waste, garden waste, human and animal manure and so on.

Perishable garbage has the following hazards: harmful gases such as ammonia and sulfide released by the perishable garbage piled up outdoors will pollute the atmosphere and urban living environment; high-concentration leachate produced in the process of piling and spoilage will seriously pollute the water body; it is easy to breed pathogenic microorganisms, mosquitoes, flies, cockroaches, mice, and other harmful organisms, affecting the health of residents; a lot of land is occupied; and accidents such as garbage explosions may be caused. Therefore, serious harm will be caused to the lift and ecological environment of residents if urban organic waste cannot be effectively treated, and thus the treatment of urban organic waste must be paid attention to by all parties.

The traditional main treatment mode for perishable garbage mainly adopts a centralized treatment mode, that is, household garbage in a city is collected uniformly and transported to a centralized treatment plant for treatment. Common methods include composting treatment, incineration treatment, pyrolysis treatment, landfill treatment and biological treatment, etc., but the existing centralized treatment methods need to be further improved. For example, composting treatment has the disadvantages of relatively low treatment efficiency, unstable treatment process caused by different components of waste, and large floor area. Incineration treatment has the disadvantages of the risk of producing secondary pollutants such as dioxins, and waste of resources. Pyrolysis treatment has the disadvantages of strong professionalism in operation, and limited pathways for resource utilization of existing products. Landfill treatment has the disadvantages of large floor area and high removal cost. The use of biological treatment processes such as black soldier flies, earthworms and anaerobic fermentation by microorganisms has the disadvantages of relatively low conversion efficiency, great influence by climate and other environments, and large floor area.

On the other hand, with the gradual popularization and implementation of garbage sorting in cities and rural areas, requirements for sorted collection, sorted transportation and sorted treatment of household perishable garbage such as sorted kitchen waste and garden garbage have been put forward, while an independent organic garbage collection and transportation system is huge and complicated, with high cost and many problems. These problems are particularly serious in small and medium-sized counties and cities with low population density and low garbage production intensity, and the current separate treatment technology for sorted organic garbage still needs to be improved. As a result, residents sort their garbage at the source, but the sorted garbage is mixed together again by garbage removal and treatment units for removal or treatment, which greatly dampens the enthusiasm of residents to implement garbage sorting and delays the popularization and implementation of garbage sorting.

The existence of the above problems puts forward an objective demand for decentralized treatment of perishable garbage at the source, that is, the garbage is sorted at the source with families as the unit and effectively treated, which not only can solve the problems of sorted transportation and sorted treatment faced by the sorted and collected garbage at present, but also can achieve the resource utilization of products at the source, thus reducing energy consumption in the processes of centralized treatment, removal and collection, resource utilization and distribution of centrally treated products and the like. While reducing treatment cost, significant carbon emission reduction effect and obvious social and environmental benefits are achieved.

At present, the commonly used decentralized treatment technologies for organic waste in China and at abroad include kitchen waste crushing treatment technology, household composting treatment technology, earthworm reactor, water evaporation treatment equipment, small-scale pyrolysis equipment, etc. The small-scale pyrolysis decentralized treatment equipment for organic waste has attracted attention of people due to its advantages of high treatment efficiency, relatively stable process and high value of biochar resource utilization from pyrolysis products. However, generally speaking, household pyrolysis processes and equipment still have shortcomings such as a lack of basic technical theoretical support and insufficient design and development capabilities of equipment, so it is urgent to develop new treatment devices.

SUMMARY

For addressing the disadvantages in the existing household perishable garbage treatment, a novel and efficient treatment equipment and a use method thereof is proposed in the present disclosure.

To achieve the objective above, the present disclosure provides the following technical solution:

A household perishable garbage treatment equipment, including a crushing unit, a pyrolysis unit, and a condensation and washing unit.

The crushing unit includes a crushing housing, a cooling water inlet pipe, a crushing device basket, a crushing device, and a cooling water and leachate outlet. A top of the crushing housing is openable, the cooling water inlet pipe is arranged at one side of an upper part of the crushing housing, the crushing device basket is configured for containing perishable organic garbage to be crushed, the crushing device basket is arranged in the crushing housing, the crushing device is arranged in the crushing device basket, and the cooling water and leachate outlet is arranged at a bottom of the crushing housing.

The pyrolysis unit includes a pyrolysis housing, a pyrolysis device basket, solid heat medium, a pyrolysis unit gas outlet, and a heating plate. The pyrolysis device basket is arranged in the pyrolysis housing, the heating plate is arranged at a bottom of the pyrolysis housing, the solid heat medium is arranged inside both the pyrolysis housing and the pyrolysis device basket, the pyrolysis device basket is configured for containing the crushed perishable organic garbage, the pyrolysis unit gas outlet is arranged at one side of an upper part of the pyrolysis housing, and the pyrolysis unit gas outlet is in communication with the condensation and washing unit.

The condensation and washing unit includes a condensation housing, a pyrolysis gas pipeline, a condensation and washing unit gas outlet, a condensation device, a condensate receiving device, a residual exhaust gas discharge pipeline, and an exhaust gas absorption and washing device. The pyrolysis gas pipeline and the condensation and washing unit gas outlet are arranged on an upper part of the condensation housing, an end of the pyrolysis gas pipeline is in communication with the pyrolysis unit gas outlet, another end of the pyrolysis gas pipeline passes through the condensation device and is in communication with the condensate receiving device, an upper part of the condensate receiving device is in communication with an end of the residual exhaust gas discharge pipeline, and another end of the residual exhaust gas discharge pipeline extends to a bottom of the exhaust gas absorption and washing device; and the exhaust gas absorption and washing device is configured for containing condensate.

Optionally, the crushing housing, the pyrolysis housing and the condensation housing are all made of heat-resistant plastic.

Optionally, removable cover plates are arranged on the top of the crushing housing and a top of the pyrolysis housing, respectively.

Optionally, the crushing device includes a crushing blade, a blade mounting rod, and a top mounting head. The crushing blade is arranged on an outer wall of the blade mounting rod, the top mounting head is arranged on a top of the blade mounting rod, and the top mounting head is configured to be connected to a driving device.

Optionally, the crushing device basket is of a cylindrical structure with an open top, and multiple holes are evenly distributed on a surface of the crushing device basket at intervals.

Optionally, the pyrolysis device basket is of a mesh bag shaped structure with an open top, and the pyrolysis device basket is made of stainless-steel wire mesh.

Optionally, the solid heat medium is one or more of sand, kaolin, quartz sand, stone powder, yellow loam and red loam with a particle size less than 5 mm.

Optionally, the pyrolysis housing is lined with thermal insulation material inside.

Optionally, the condensate is tap water, sodium hydroxide, dilute hydrochloric acid, sodium bicarbonate, or ethanol.

A use method of a household perishable garbage treatment equipment is further proposed in the present disclosure. The method includes the following steps: firstly, crushing perishable organic garbage, that is, placing, by a user, household perishable organic garbage into a crushing device basket, arranging a cover plate on a top of a crushing housing, turning on cooling water, starting a crushing device to crush the perishable organic garbage to a certain extent, wherein cooling water and landfill leachate are discharged into a sewage pipe network through a cooling water and leachate outlet; secondly, performing pyrolysis treatment on the crushed perishable organic garbage, that is, taking out, by the user, the crushing device basket, pouring the crushed perishable organic garbage into a pyrolysis device basket, placing the pyrolysis device basket into a pyrolysis unit, filling the pyrolysis unit and the pyrolysis device basket with solid heat medium to fully surround the crushed perishable organic garbage, and then arranging a cover plate on a top of the pyrolysis housing, starting a heating plate for heating, increasing temperature to a certain degree and keeping the temperature for a period of time to achieve full pyrolysis of the perishable organic garbage, wherein gas produced during pyrolysis is exhausted into a pyrolysis gas pipeline through a pyrolysis unit gas outlet, and by means of structural features of the pyrolysis device basket, the solid heat medium is capable of being screened and separated, and pyrolysis biochar is capable of being collected regularly; and during pyrolysis, turning on a condensation and washing unit to condense and collect low-boiling pyrolysis liquid in the pyrolysis gas, wherein non-condensable components of the gas are treated by an exhaust gas absorption and washing device and discharged from the device.

Compared with the prior art, the present disclosure obtains the following beneficial technical effects:

In the present disclosure, the household perishable garbage treatment equipment and the use method thereof can effectively treat perishable garbage on the spot, reduce the collection and treatment cost required by traditional perishable garbage treatment modes, achieve carbon sequestration and resource utilization of products, and have significant economic, ecological and social benefits.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still obtain other drawings from these accompanying drawings without creative efforts.

FIG. 1 is a schematic diagram of structure of a household perishable garbage treatment equipment according to an embodiment of the present disclosure.

In the drawings: 1—crushing unit; 2—pyrolysis unit; 3—condensation and washing unit; 1-1—cooling water inlet pipe; 1-2—crushing device basket; 1-3—crushing device; 1-4—perishable organic garbage to be crushed; 1-5—cooling water and leachate outlet; 2-1—pyrolysis device basket; 2-2—solid heat medium; 2-3—pyrolysis unit gas outlet; 2-4—heating plate; 2-5—pyrolytic biochar; 3-1—pyrolysis gas pipeline; 3-2—condensation and washing unit gas outlet; 3-3—condensation device; 3-4—condensate receiving device; 3-5—residual exhaust gas discharge pipeline; 3-6—exhaust gas absorption and washing device.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

As shown in FIG. 1, the present embodiment provides a household perishable garbage treatment equipment, including a crushing unit 1, a pyrolysis unit 2, and a condensation and washing unit 3.

The crushing unit 1 includes a crushing housing, a cooling water inlet pipe 1-1, a crushing device basket 1-2, a crushing device 1-3, and a cooling water and leachate outlet 1-5. A top of the crushing housing is openable, the cooling water inlet pipe 1-1 is arranged at one side of an upper part of the crushing housing, the crushing device basket 1-2 is configured for containing perishable organic garbage to be crushed 1-4, the crushing device basket 1-2 is arranged in the crushing housing, the crushing device 1-3 is arranged in the crushing device basket 1-2, and the cooling water and leachate outlet 1-5 is arranged at a bottom of the crushing housing.

The pyrolysis unit 2 includes a pyrolysis housing, a pyrolysis device basket 2-1, solid heat medium 2-2, a pyrolysis unit gas outlet 2-3, and a heating plate 2-4. The pyrolysis device basket 2-1 is arranged in the pyrolysis housing, the heating plate 2-4 is arranged at a bottom of the pyrolysis housing, the solid heat medium 2-2 is arranged inside both the pyrolysis housing and the pyrolysis device basket 2-1, the pyrolysis device basket 2-1 is configured for containing the crushed perishable organic garbage, the pyrolysis unit gas outlet 2-3 is arranged at one side of an upper part of the pyrolysis housing, and the pyrolysis unit gas outlet 2-3 is in communication with the condensation and washing unit 3.

The condensation and washing unit 3 includes a condensation housing, a pyrolysis gas pipeline 3-1, a condensation and washing unit gas outlet 3-2, a condensation device 3-3, a condensate receiving device 3-4, a residual exhaust gas discharge pipeline 3-5, and an exhaust gas absorption and washing device 3-6. The pyrolysis gas pipeline 3-1 and the condensation and washing unit gas outlet 3-2 are arranged on an upper part of the condensation housing, an end of the pyrolysis gas pipeline 3-1 is in communication with the pyrolysis unit gas outlet 3-2, another end of the pyrolysis gas pipeline 3-1 passes through the condensation device 3-3 and is in communication with the condensate receiving device 3-4, an upper part of the condensate receiving device 3-4 is in communication with an end of the residual exhaust gas discharge pipeline 3-5, and another end of the residual exhaust gas discharge pipeline 3-5 extends to a bottom of the exhaust gas absorption and washing device 3-6; and the exhaust gas absorption and washing device 3-6 is configured for containing condensate.

In this specific embodiment, the crushing housing is made of heat-resistant plastic, which is of a cuboid structure with a length, width and height of 25 cm×30 cm×30 cm. When a cover plate is removed, the crushing device 1-3 can be installed, which includes a crushing blade, a blade mounting rod, and a top mounting head. The crushing blade is arranged on an outer wall of the blade mounting rod, and the top mounting head is arranged on a top of the blade mounting rod, and the top mounting head is configured to be connected to a driving device. The crushing blade is a propeller-shaped stainless-steel blade with a total length of 10 cm at the bottom. The crushing blade mounting rod is a stainless-steel rod with a diameter of 10 mm and a height of 15 cm. The top mounting head is connected to a power supply and can rotate the crushing blade to cut and crush perishable garbage. The crushing device basket 1-2 has a diameter of 20 cm and a height of 17 cm, and is made of stainless steel. Circular holes with a diameter of 0.5 cm are evenly distributed on a surface of the crushing device basket at intervals of 3 cm. The blade of the crushing device 1-3 is installed and fixed at the center of the crushing device basket 1-2, and thus the crushing device basket 1-2 can be hung in the crushing unit 1 by a hook.

After the crushing device basket and crushing device 1-3 are installed, the perishable garbage can be placed in the basket, then the cover plate is arranged, cooling water is turned on, and the crushing device 1-3 is started for crushing. The cooling water inlet pipe 1-1 has a diameter of 2 cm and is connected to a household tap, and a water outlet of the cooling water inlet pipe 1-1 is located above the crushing device basket 1-2. The cooling water is sprayed in a direction tangential to the rotation of the blade, thus playing a role in cooling and cleaning. During crushing, the cooling water and landfill leachate are discharged into a sewer through the cooling water and leachate outlet 1-5, and the cooling water and leachate outlet 1-5 has a diameter of 2 cm, a lower part of which is directly connected to a sewer pipe with a plastic hose.

The pyrolysis housing is made of the heat-resistant plastic. A removable cover plate is arranged on a top of the pyrolysis housing. The pyrolysis housing is of a cuboid structure with a length, width and height of 10 cm×30 cm×30 cm. The pyrolysis housing is lined with thermal insulation cotton inside. The cover plate can be removed from an upper part of the pyrolysis unit 2 for placing or taking out the pyrolysis device basket 2-1. The pyrolysis device basket 2-1 is of a cuboid mesh bag shaped structure with a hollow upper part and closed at periphery and bottom, and with a length, width and height of 9 cm×28 cm×28 cm. The mesh bag is made of stainless-steel wire mesh with a hole diameter of 5 mm. The solid heat medium 2-2 is placed in the pyrolysis unit 2, and the solid heat medium 2-2 is sand with a particle size less than 2 mm.

After the perishable garbage is crushed in the crushing unit 1, the crushing device basket 1-2 can be taken out, the crushed perishable garbage in the crushing basket is poured into the pyrolysis device basket. Then, the pyrolysis device basket 2-1 is fixed into the pyrolysis unit 2 by a hook, the periphery of the pyrolysis device basket 2-1 is filled with the solid heat medium 2-2, such that the periphery of the crushed perishable organic garbage can be fully surround by the solid heat medium 2-2. After that, the cover plate is arranged on the pyrolysis unit 2, the heating plate 2-4 is started, and after the temperature is increased to a certain degree and kept for a period of time, full pyrolysis of perishable organic garbage can be achieved. The heating plate 2-4 is installed at a bottom of the pyrolysis unit 2, with a length, width and thickness of 9 cm×28 cm×1 cm, and is made of a stainless-steel plate containing heat wires. During pyrolysis, when the cover plate is arranged at the upper part of the pyrolysis unit 2, the pyrolysis gas can only be discharged from the pyrolysis unit 2 through the pyrolysis unit gas outlet 2-3. The pyrolysis unit gas outlet 2-3 is a heat-resistant plastic circular tube with a diameter of 3 cm, which has a length of 2 cm inside the pyrolysis unit 2 and a mesh cover wrapped outside. The pyrolysis unit gas outlet 2-3 is connected to the pyrolysis gas pipeline 3-1 in the condensation and washing unit 3, and the produced gas is discharged into the pyrolysis gas pipeline 3-1 from the pyrolysis unit gas outlet 2-3.

After pyrolysis is finished, the pyrolysis device basket 2-1 is taken out from the pyrolysis unit 2. Under the action of gravity, the solid heat medium 2-2 with a particle size less than the mesh diameter of the pyrolysis device basket 2-1 falls from the basket, and the pyrolytic biochar 2-5 with a particle size greater than 5 mm after pyrolysis is intercepted into the basket and then taken out of the device.

The condensation housing is made of heat-resistant plastic, the condensation and washing unit 3 is of a cuboid structure with a length, width and height of 30 cm×30 cm×30 cm. During pyrolysis, the condensation device 3-3 is turned on to condense and wash the pyrolysis gas, that is, the pyrolysis gas produced in the pyrolysis unit 2, under the effect of heating and pressurization, enters the pyrolysis gas pipeline 3-1 through the pyrolysis unit gas outlet 2-3. The pyrolysis gas pipeline 3-1 is made of heat-resistant plastic with a diameter of 3 cm, and a gas outlet of which is connected to the condensation device 3-3. The condensation device 3-3 is a cylindrical condensation tube made of glass with a diameter of 5 cm and a length of 20 cm, a glass gas pipeline with a diameter of 2 cm is arranged in the condensation tube, a space for cooling water to flow in and out is formed in an external cylindrical annular closed cavity, and the condensation device 3-3 is connected to a tap water pipe for providing cooling water.

When the pyrolysis gas 3 enters the condensation device 3-3, a part of its components is cooled by the cooling water in the condensation device 3-3 and enter the condensate receiving device. The condensate receiving device is a cone-shaped glass bottle with a height of 8 cm and a diameter of 6 cm, and the residual exhaust gas discharge pipeline 3-5 is arranged at a side face of the condensate receiving device. After passing through the condensate receiving device 3-4, residual exhaust gas enters the exhaust gas absorption and washing device 3-6, and the exhaust gas absorption and washing device 3-6 is a cylindrical glass container with a diameter of 10 cm and a height of 8 cm, and containing 80% of the volume of tap water inside. The exhaust gas, after being absorbed and deodorized by washing liquid, enters the condensation and washing unit 3 and is discharged from the device through the condensation and washing unit gas outlet 3-2, and the condensation and washing unit gas outlet 3-2 is a plastic pipe with a diameter of 3 cm.

Embodiment 2

A use method of the household perishable garbage treatment equipment in Embodiment 1 is further proposed in the present disclosure. Firstly, perishable organic garbage is crushed, that is, the household perishable organic garbage is placed into a crushing device basket 1-2 by a user, a cover plate is arranged on a top of a crushing housing, cooling water is turned on, a crushing device 1-3 is started to crush the perishable organic garbage to a certain extent, wherein the cooling water and landfill leachate are discharged into a sewage pipe network through a cooling water and leachate outlet 1-5. Secondly, pyrolysis treatment is performed on the crushed perishable organic garbage, the crushing device basket 1-2 is taken out by the user, the crushed perishable organic garbage is poured into a pyrolysis device basket 2-1, and the pyrolysis device basket 2-1 is placed into a pyrolysis unit 2; then the pyrolysis unit and the pyrolysis device basket are filled with solid heat medium 2-2 to fully surround the crushed perishable organic garbage, and then a cover plate is arranged on a top of a pyrolysis housing, a heating plate 2-4 is started, the temperature is increased to a certain degree and kept for a period of time to achieve full pyrolysis of the perishable organic garbage. Gas produced during pyrolysis is discharged into a pyrolysis gas pipeline 3-1 through a pyrolysis unit gas outlet 2-3, and by means of structural features of the pyrolysis device basket 2-1, the solid heat medium 2-2 can be screened and separated, and pyrolytic biochar 2-5 can be collected regularly. During pyrolysis, a condensation and washing unit 3 is turned on to condense and collect low-boiling pyrolysis liquid in the pyrolysis gas, and non-condensable components of the gas are treated by an exhaust gas absorption and washing device 3-6 and discharged from the device.

It should be noted that it is apparent to those skilled in the art that the present disclosure is not limited to the details of the above exemplary embodiments, and can be realized in other specific forms without departing from the spirit or basic characteristics of the present disclosure. Therefore, the embodiments should be considered as exemplary and non-limiting in all aspects, and the scope of the present disclosure is defined by the appended claims rather than the above description, so it is intended to embrace all changes that fall within the meaning and range of equivalents of the claims, and any reference signs in the claims should not be regarded as limiting the claims involved.

Specific examples are used herein for illustration of the principles and implementations of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A household perishable garbage treatment equipment, comprising a crushing unit, a pyrolysis unit, and a condensation and washing unit;

the crushing unit comprises a crushing housing, a cooling water inlet pipe, a crushing device basket, a crushing device, and a cooling water and leachate outlet; a top of the crushing housing is openable, the cooling water inlet pipe is arranged at one side of an upper part of the crushing housing, the crushing device basket is configured for containing perishable organic garbage to be crushed, the crushing device basket is arranged in the crushing housing, the crushing device is arranged in the crushing device basket, and the cooling water and leachate outlet is arranged at a bottom of the crushing housing;

the pyrolysis unit comprises a pyrolysis housing, a pyrolysis device basket, solid heat medium, a pyrolysis unit gas outlet, and a heating plate; the pyrolysis device basket is arranged in the pyrolysis housing, the heating plate is arranged at a bottom of the pyrolysis housing, the solid heat medium is arranged inside both the pyrolysis housing and the pyrolysis device basket, the pyrolysis device basket is configured for containing the crushed perishable organic garbage, the pyrolysis unit gas outlet is arranged at one side of an upper part of the pyrolysis housing, and the pyrolysis unit gas outlet is in communication with the condensation and washing unit;

the condensation and washing unit comprises a condensation housing, a pyrolysis gas pipeline, a condensation and washing unit gas outlet, a condensation device, a condensate receiving device, a residual exhaust gas discharge pipeline, and an exhaust gas absorption and washing device; the pyrolysis gas pipeline and the condensation and washing unit gas outlet are arranged on an upper part of the condensation housing, an end of the pyrolysis gas pipeline is in communication with the pyrolysis unit gas outlet, another end of the pyrolysis gas pipeline passes through the condensation device and is in communication with the condensate receiving device, an upper part of the condensate receiving device is in communication with an end of the residual exhaust gas discharge pipeline, and another end of the residual exhaust gas discharge pipeline extends to a bottom of the exhaust gas absorption and washing device; and the exhaust gas absorption and washing device is configured for containing condensate;

wherein the crushing housing, the pyrolysis housing and the condensation housing are all made of heat-resistant plastic.

2. The household perishable garbage treatment equipment according to claim 1, wherein removable cover plates are arranged on the top of the crushing housing and a top of the pyrolysis housing, respectively.

3. The household perishable garbage treatment equipment according to claim 1, wherein the crushing device comprises a crushing blade, a blade mounting rod, and a top mounting head; the crushing blade is arranged on an outer wall of the blade mounting rod, the top mounting head is arranged on a top of the blade mounting rod, and the top mounting head is configured to be connected to a driving device.

4. The household perishable garbage treatment equipment according to claim 1, wherein the crushing device basket is of a cylindrical structure with an open top, and a plurality of holes are evenly distributed on a surface of the crushing device basket at intervals.

5. The household perishable garbage treatment equipment according to claim 1, wherein the pyrolysis device basket is of a mesh bag shaped structure with an open top, and the pyrolysis device basket is made of stainless-steel wire mesh.

6. The household perishable garbage treatment equipment according to claim 1, wherein the solid heat medium is one or more of sand, kaolin, quartz sand, stone powder, yellow loam and red loam with a particle size less than 5 mm.

7. The household perishable garbage treatment equipment according to claim 1, wherein the pyrolysis housing is lined with thermal insulation material inside.

8. The household perishable garbage treatment equipment according to claim 1, wherein the condensate is tap water, sodium hydroxide, dilute hydrochloric acid, sodium bicarbonate, or ethanol.

9. A use method of a household perishable garbage treatment equipment, comprising the following steps:

firstly, crushing perishable organic garbage, that is, placing, by a user, household perishable organic garbage into a crushing device basket, arranging a cover plate on a top of a crushing housing, turning on cooling water, starting a crushing device to crush the perishable organic garbage to a certain extent, wherein cooling water and landfill leachate are discharged into a sewage pipe network through a cooling water and leachate outlet;

secondly, performing pyrolysis treatment on the crushed perishable organic garbage, that is, taking out, by the user, the crushing device basket, pouring the crushed perishable organic garbage into a pyrolysis device basket, placing the pyrolysis device basket into a pyrolysis unit, and then filling the pyrolysis unit and the pyrolysis device basket with solid heat medium to fully surround the crushed perishable organic garbage, and then arranging a cover plate on a top of the pyrolysis housing, starting a heating plate for heating, increasing temperature to a certain degree and keeping the temperature for a period of time to achieve full pyrolysis of the perishable organic garbage, wherein gas produced during pyrolysis is discharged into a pyrolysis gas pipeline through a pyrolysis unit gas outlet, and by means of structural features of the pyrolysis device basket, the solid heat medium is capable of being screened and separated, and pyrolysis biochar is capable of being collected regularly; and during pyrolysis, turning on a condensation and washing unit to condense and collect low-boiling pyrolysis liquid in the pyrolysis gas, wherein non-condensable components of the gas are treated by an exhaust gas absorption and washing device and discharged from the device.

* * * * *